United States Patent
Lester et al.

(10) Patent No.: US 6,203,771 B1
(45) Date of Patent: Mar. 20, 2001

(54) CATALYTIC CONVERTER WITH METAL MONOLITH HAVING AN INTEGRAL CATALYST

(75) Inventors: George Ronald Lester, Park Ridge; Stephen Thomas Homeyer, Glenview, both of IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 08/271,922

(22) Filed: Jul. 7, 1994

Related U.S. Application Data

(63) Continuation-in-part of application No. 07/967,591, filed on Oct. 28, 1992, now abandoned.

(51) Int. Cl.[7] .......................... C01B 13/00; B01D 53/34; B01J 21/04
(52) U.S. Cl. .......................... 423/219; 422/177; 422/180; 502/439
(58) Field of Search .................................. 422/180, 177, 422/171, 222; 55/DIG. 30, 523; 502/327, 333, 320, 439, 527, 322–324; 423/219

(56) References Cited

U.S. PATENT DOCUMENTS

| | | | |
|---|---|---|---|
| 3,083,662 | * 4/1963 | Zeidler | 165/155 |
| 3,542,124 | * 11/1970 | Manfredo | 165/166 |
| 4,348,360 | 9/1982 | Chang et al. | 422/122 |
| 4,405,507 | 9/1983 | Carr et al. | 252/466 |
| 4,472,533 | 9/1984 | Moskovits | 502/320 |
| 4,665,051 | * 5/1987 | Nonnenmann | 422/180 |
| 4,672,809 | * 6/1987 | Cornelion et al. | 422/180 |
| 5,145,822 | 9/1992 | Falke et al. | 502/150 |

FOREIGN PATENT DOCUMENTS

| | | |
|---|---|---|
| 0 152 560 | 11/1984 | (EP) . |
| 0 281 364 | 9/1988 | (EP) . |
| 0 388 094 | 9/1990 | (EP) . |
| 0 461 452 | 12/1991 | (EP) . |
| 52-048594 | 12/1977 | (JP) . |

OTHER PUBLICATIONS

D. Honicke, Applied Catalysis, 5 (1983) p. 179–198 Elsevier Scientific Publishing Co.

Yamada et al., 8th International Congress on Catalysis, 1984, vol. IV, p. 835–846.

L. Hegedus Pet. Div. ACS Preprints, Aug., 1973, p. 487–502.

* cited by examiner

Primary Examiner—Hien Tran
(74) Attorney, Agent, or Firm—William J. Zak, Jr., Esq.

(57) ABSTRACT

An improved catalytic converter which comprises a metal monolith made of aluminum or aluminum alloy having an anodized surface layer on which is disposed catalytic metals, particularly noble metals from Group VIII and optionally base metals. In a preferred embodiment the metal monolith employs plate fin elements defining a large plurality of fins arranged in an axial succession of offset fin rows. The catalytic converter has application in the conversion of ozone and the oxidation of atmospheric pollutants.

20 Claims, 8 Drawing Sheets

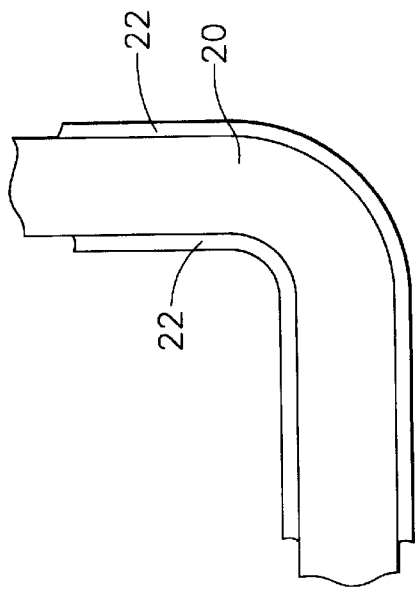
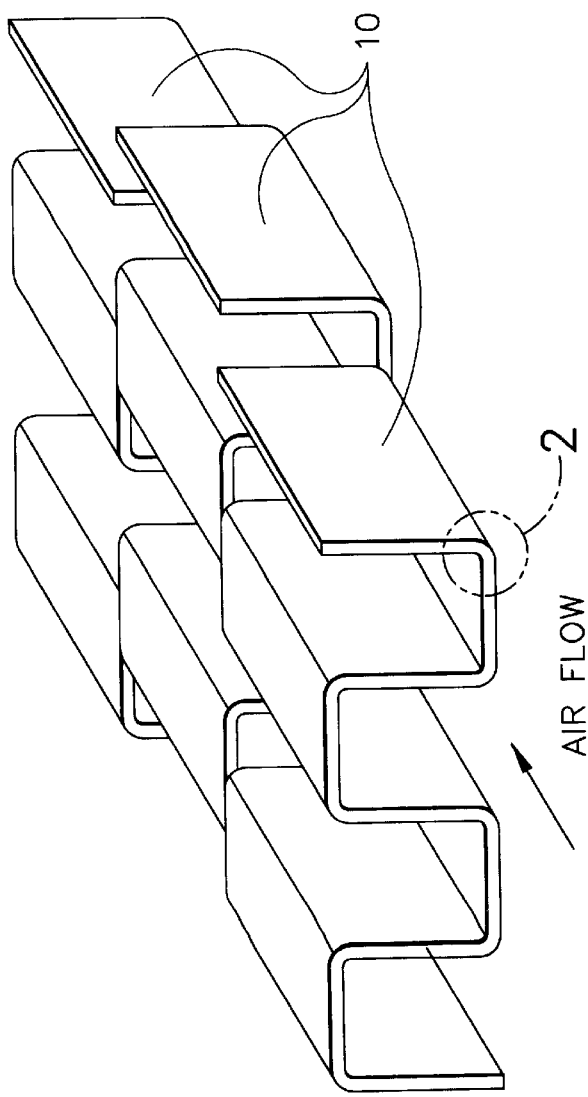

Unanodized Fin Sample

Anodized at ca. 16°C – 23°C
$T_c = 825°F$

Anodized at ca. 23°C – 25°C
$T_c = 825°F$

Anodized at ca. 30°C – 37°C
$T_c = 825°F$

Anodized at ca. 30°C - 37°C
$T_c = 300°F$

Anodized at ca. 30°C – 37°C
$T_c = 750°F$

Anodized at ca. 30°C – 37°C
$T_c = 1000°F$

CATALYTIC CONVERTER WITH METAL MONOLITH HAVING AN INTEGRAL CATALYST

This is a continuation-in-part of U.S. Ser. No. 07/967,591 filed Oct. 28, 1992, now abandoned.

BACKGROUND OF THE INVENTION

This invention relates to improvements in monolithic catalytic converters, particularly, but not limited to, those used to remove ozone from the conditioned air supplied to aircraft cabins.

Environmental control systems for aircraft supply pressurized and conditioned air to the aircraft cabin. The temperature, pressure, and relative humidity must be controlled to provide for the comfort of flight crew and passengers within the aircraft.

Modern jet aircraft are typically designed for fuel-efficient operation at relatively high altitudes of 25,000 feet or more above sea level. At such altitudes, the ozone content in ambient air is relatively high and thus the air supplied to the aircraft environmental control system can contain a substantial amount of ozone. It can cause lung and eye irritation, headaches, fatigue and/or breathing discomfort.

Catalytic converters have been used to reduce or eliminate undesirable ozone in the air supplied to aircraft cabins. Ceramic monolithic supports have been used which carry catalysts on a washcoat applied to their surfaces, for example, in U.S. Pat. No. 4,405,507. Aluminum honeycomb was treated with NaOH and then solutions of catalytic metals in the ozone converter described in U.S. Pat. No. 4,348,360. In published European patent application 0 388 094 (U.S. Pat. No. 5,080,882) an ozone catalyst is disclosed in which an aluminum surface is oxidized at high temperature to produce an alumina to support a coprecipitated catalyst. Another ozone catalyst was described in published European patent application 0 461 452 (U.S. Pat. No. 5,145,822). In this instance, particulate catalysts were attached by an elastic organic adhesive to a metal foil support.

In co-pending U.S. patent application Ser. No. 07/926,798 an improved catalytic ozone converter of compact size and lightweight construction is disclosed.

The present invention relates to the catalyst employed in such converters, the catalyst being integral with the converter structure and comprising aluminum oxide formed by anodizing the converter structure.

Formation of alumina catalyst by anodization of an aluminum surface was reported by D. Honicke in Applied Catalysis, 5 (1983) 179–198, Elsevier Scientific Publishing Company. Similarly Yamada et al., 8th International Congress on Catalysis, 1984, Vol. IV, p. 835–846, reported an investigation of anodizing aluminum and its use as a catalyst.

The use of an anodized aluminum as a support for automobile catalytic converters was disclosed in Japanese Patent 52 048594. Another method of preparing an anodized surface for use in catalysts is described in European Patent Application 0 281 364. The aluminum is electrolytically etched before anodizing in order to increase the surface area of the alumina film. In this instance, the catalytic metals are also electrolytically deposited as suggested in U.S. Pat. No. 4,472,533.

The monolithic converters of the invention need not be limited to ozone destruction, but also may be employed in many applications where ceramic monoliths have been used. Such ceramic monoliths are commonly coated with a high surface area support which is not required by the present invention.

SUMMARY OF THE INVENTION

In general, the invention is a catalytic converter and the method of making it in which an aluminum or aluminum alloy monolith is anodized and thereafter optionally calcined under certain conditions which provide a suitable surface and then impregnated with catalytic metals.

The catalytic converter structure preferably comprises one or more plate-fin elements which incorporate the catalyst and are retained within a housing in a generally cylindrical configuration. The plate-fin element or elements define a large plurality of fins arranged in an axial succession of offset or staggered fin rows to obtain relatively high mass transfer between a gas flow stream and the catalyst, but with minimal pressure drop.

The converter structure is made of aluminum or an aluminum alloy which provides lightweight and low cost. The catalyst is integral with the aluminum structure rather than being deposited on the structure by washcoating. This result is achieved by anodizing the structure to provide an aluminum oxide surface layer at least about 2 $\mu$m thick, preferably at least about 10 $\mu$m and having a relatively high surface area of about 30 to 150 m$^2$/g of the oxide layer. The surface layer has deposited on and within it Group VIII noble metals such as Pt, Pd, Rh and the like, optionally with base metals from Group VIII such as Ni, Fe, and Co or from Groups Ib, IIb, IIIa to VIIa, depending on the intended use. The amount of the Group VIII metals may be about 10 to 150 g/ft$^3$ of the monolith (0.35 to 5.30 g/L), preferably 25 to 75 g/ft$^3$ of the monolith (0.88 to 2.65 g/L). The base metals will comprise up to about 500 g/ft$^3$ (17.6 g/L) of the monolith, preferably about 200 to 400 g/ft$^3$ (7.06 to 14.1 g/L).

In one embodiment, the converter structure is anodized in an aqueous bath of 5–20 wt.% sulfuric acid at a constant temperature of 30°–37° C., preferably about 32° C., employing a direct current of about 9 amps/ft$^2$ (99.7 amps/m$^2$) at about 8–15 volts. After being anodized, the structure is washed with water, dried, and calcined at temperatures in the range of 150° to 540° C., preferably about 440° to 540° C. Optionally, the calcination may be omitted since the structure is heated to similar temperatures after impregnation with compounds of the catalytic metals.

In another embodiment the invention comprises a method for destroying ozone in air using the catalyst described above. The catalyst may be applied also in a method of oxidizing atmospheric pollutants such as hydrocarbons and carbon monoxide.

BRIEF DESCRIPTION OF THE DRAWINGS

FIG. 1 is a perspective view illustrating a portion of a plate-fin element having a succession of offset fin rows.

FIG. 2 is an enlarged view illustrating the integral catalytic surface within the indicated region of FIG. 1.

DETAILED DESCRIPTION OF THE PREFERRED EMBODIMENTS

Monolith Structure

Figure 3A:
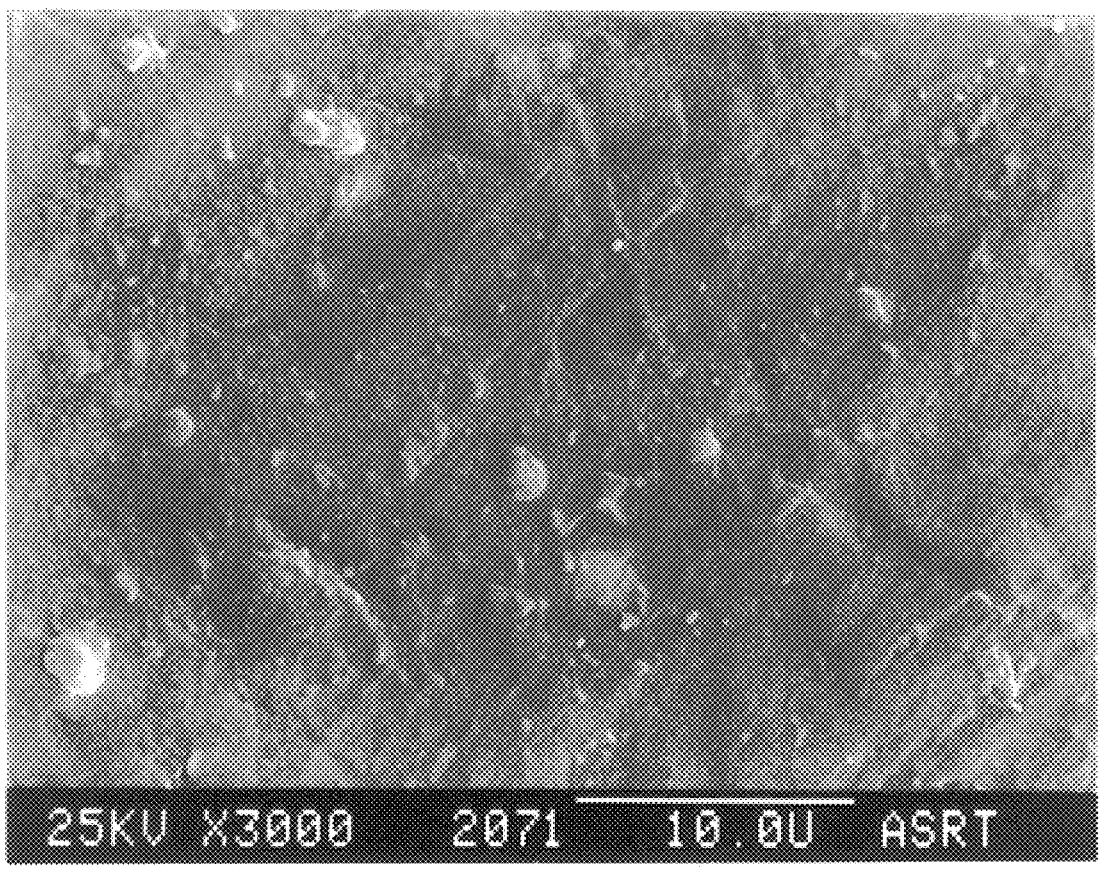
FIG. 3 is a series of photomicrographs illustrating aluminum surfaces, unanodized 3(a), anodized at 16°–20° C. (3b), at 23°–25° C. (3c), and at 30°–37° C. (3d), each calcined at 440° C.
Figure 3B:
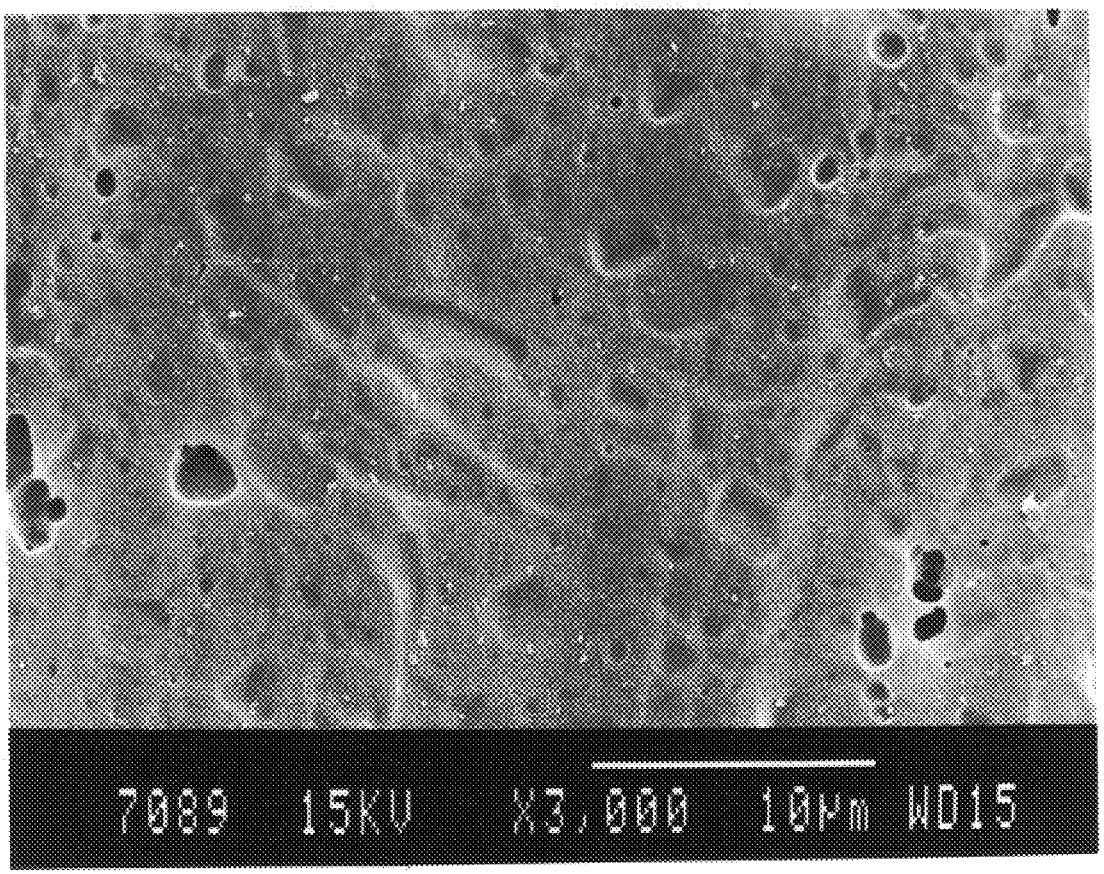
Figure 3C:
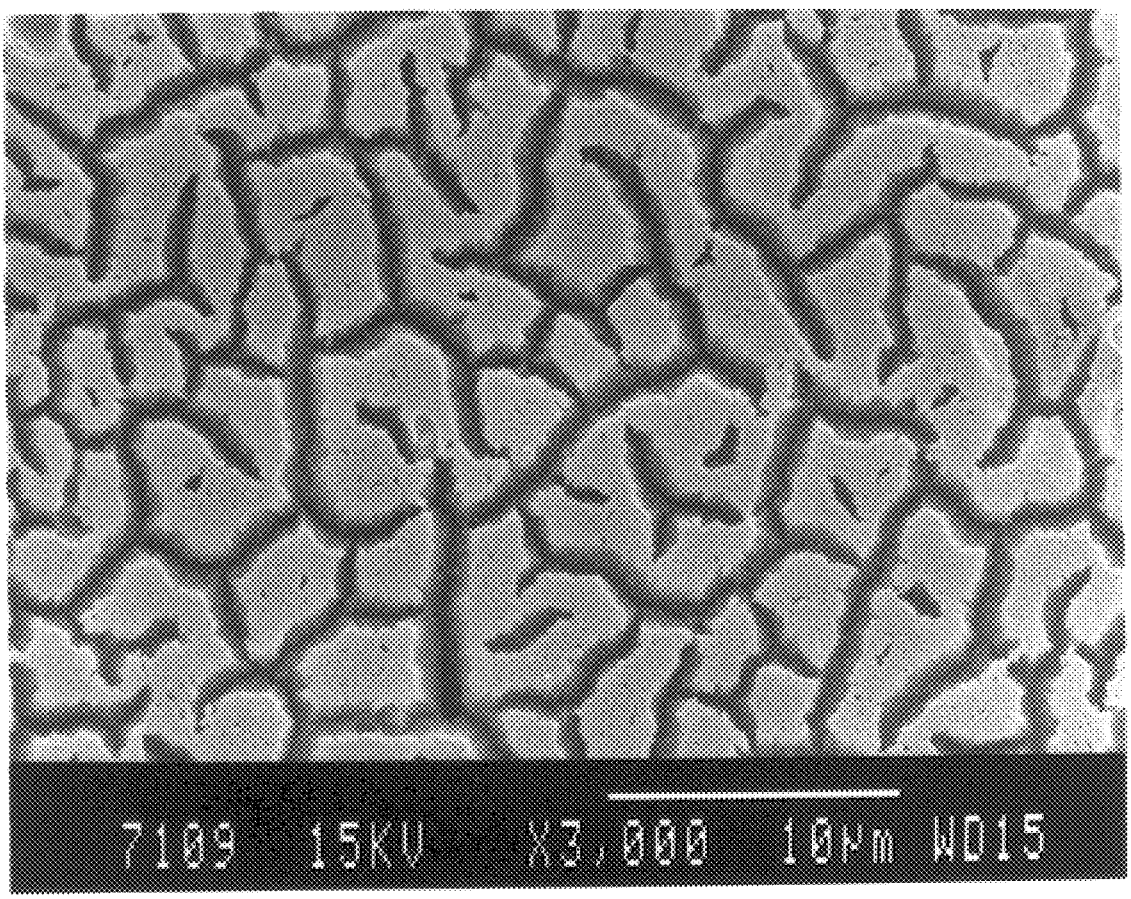

An improved catalytic converter is disclosed in co-pending U.S. patent application Ser. No. 07/926,798 where the catalytic converter of the invention provides a relatively lightweight and compact device for reducing the ozone content of air supplied to an environmental control system for aircraft cabin pressurization and/or conditioning. A similar structure is shown in European Patent 0 152 560.

The catalytic ozone converter is mounted inside a conduit through which air flows to the aircraft environmental control system. The air may be obtained from a compressor stage of a gas turbine aircraft engine, although use of ram air and/or a combination of engine bleed and ram air are known in the art.

In a preferred embodiment the converter core comprises a plurality of plate-fin elements mounted within a cylindrical housing to define a multitude of small direction-changing tortuous flow paths. The plate-fin elements are arranged in a tightly packed cylindrical configuration, as a plurality of generally concentric annular rings. The center of the cylindrical space defined by the housing may be occupied by a small diameter support tube containing a short plate-fin element strip.

Each plate-fin element is constructed from a relatively lightweight metal substrate material such as aluminum or aluminum alloy which has been shaped as by stamping to define raised fins. As shown in FIG. 1, the fins are arranged in an axial succession of adjacent rows 10, with the fins preferably having a corrugated configuration of generally rectangular profile. The fins of each row are laterally staggered or offset relative to the fins at the adjacent leading and trailing sides thereof. Each plate fin element comprises an integral catalyst according to the present invention.

This construction provides a large plurality of small tortuous flow paths extending axially through the converter core to achieve intimate mass transfer between the incoming air flow stream and the catalyst. The efficient decomposition of ozone in the flow stream is accomplished with relatively minimal pressure drop across the converter core. Thus, substantial air inflow rates can be maintained without exceeding ozone content limits. In addition, it is not necessary to separate the elements to create turbulent flow as has been recommended with conventional monolithic supports (e.g. U.S. Pat. No. 4,348,360) which typically have straight passageways and promote laminar rather than turbulent flow. A disadvantage of such plate-fin structures is that they are not easily washcoated because of the staggered fin rows and thus would not ordinarily be useful as catalyst supports. However, we have found that an anodized layer can be formed uniformly so that a catalytic converter can be produced, which is light in weight and reduced in size. In a typical case, the converter will be about five times lighter and about one-third the length of the equivalent ceramic monoliths.

FIG. 2 shows an enlarged section of one plate-fin element as encircled in FIG. 1. The aluminum or aluminum alloy structure is anodized to a depth of at least about 2 $\mu$m, preferably at least about 10 $\mu$m providing a porous integral support upon which the catalytic metals are deposited. The region 20 is the underlying metal structure while the region 22 is the anodized catalyst support.

The physical configuration just described may be employed in other applications where ceramic monoliths have been used. One such application is in the oxidation of atmospheric pollutants such as hydrocarbons, carbon monoxide, diethyl sulfide, triethylamine, ethanol and the like. In those situations, the catalytic metals will be selected to destroy the pollutants which are present.

Anodization of the Monolith

Anodizing is an electrolytic oxidation process which has been used to provide a surface coating on aluminum for protection or decoration of the aluminum or to create a porous layer which can be used as a catalyst support. The process generally involves establishing an electrolytic cell with the aluminum structure as the anode. Passing an electric current through the aluminum oxidizes the surface to an adherent aluminum oxide.

Specific conditions found to be important for preparing an aluminum oxide catalyst support by anodizing will be found in the examples below. However, more generally the process involves immersing a section of the aluminum substrate in an acidic electrolyte, preferably sulfuric acid, but which could be other acids used in anodizing such as oxalic acid, phosphoric acid and the like. The acid concentration will be selected to provide the desired oxide thickness in an acceptable time For the preferred sulfuric acid the concentration may be about 5 to 20 wt. %, preferably 9 to 15 wt. %. The aluminum substrate will be the anode, while the cathode may be various metals or carbon. The anode and cathode are connected to a source of direct current having voltage available up to about 15 volts, generally 8 to 15 volts. The voltage is varied to provide a constant anodizing current, typically about 9 amp/ft$^2$ (96.88 amp/m$^2$), selected to obtain the desired thickness.

The process is exothermic and during the time required to produce the desired surface layer, say about 30 to 60 minutes, the temperature will rise from the initial temperature unless heat is removed. It has been found that the temperature of the anodizing bath should be maintained relatively constant and above ambient, preferably above about 30° to 37° C., particularly about 32° C., since lower temperatures produce alumina surface films which are less satisfactory as catalyst supports, as will be shown in Example 6 below.

The temperature of anodization has been found to be an important factor in determining the formation of a suitable surface for catalytic applications. This is illustrated in FIG. 3 where the surface is shown to be remarkably changed when the anodization temperature is increased. The aluminum was anodized, washed with water and then calcined at 440° C. When anodized at 16°–23° C. (FIG. 3b), the surface appears relatively smooth and not much different from the appearance of unanodized aluminum (3a). These low temperatures are typical of those used to form protective surface layers and also in prior art catalytic applications where a very fine pore structure was produced, which is difficult to see at the 3000×magnification shown. Raising the anodization temperature to 23°–25° C. (FIG. 3c) produces a dramatic change in the surface appearance. A further increase to 30°–37° C. produces even more change (3d). It is this surface which has been found to provide superior catalysts as will be shown below.

The surface layer should be at least 2 $\mu$m thick, preferably at least 10 $\mu$m, and have a surface area of about 30 to 150 m$^2$/g in order to provide sufficient surface for subsequent application of the catalytic metals. However, the thickness will depend on the particular application and the thickness of the aluminum (or alloy) walls.

Following anodizing, the aluminum substrate is washed with water to remove residual acid and then dried before the next step, i.e. the deposition of catalytic metals. It is preferred that after drying the substrate is calcined in air to temperatures above 150° C., preferably 440° to 540° C. A higher surface area is produced which is more accessible to the catalytic metals and to the reacting gases.

Figure 3D:
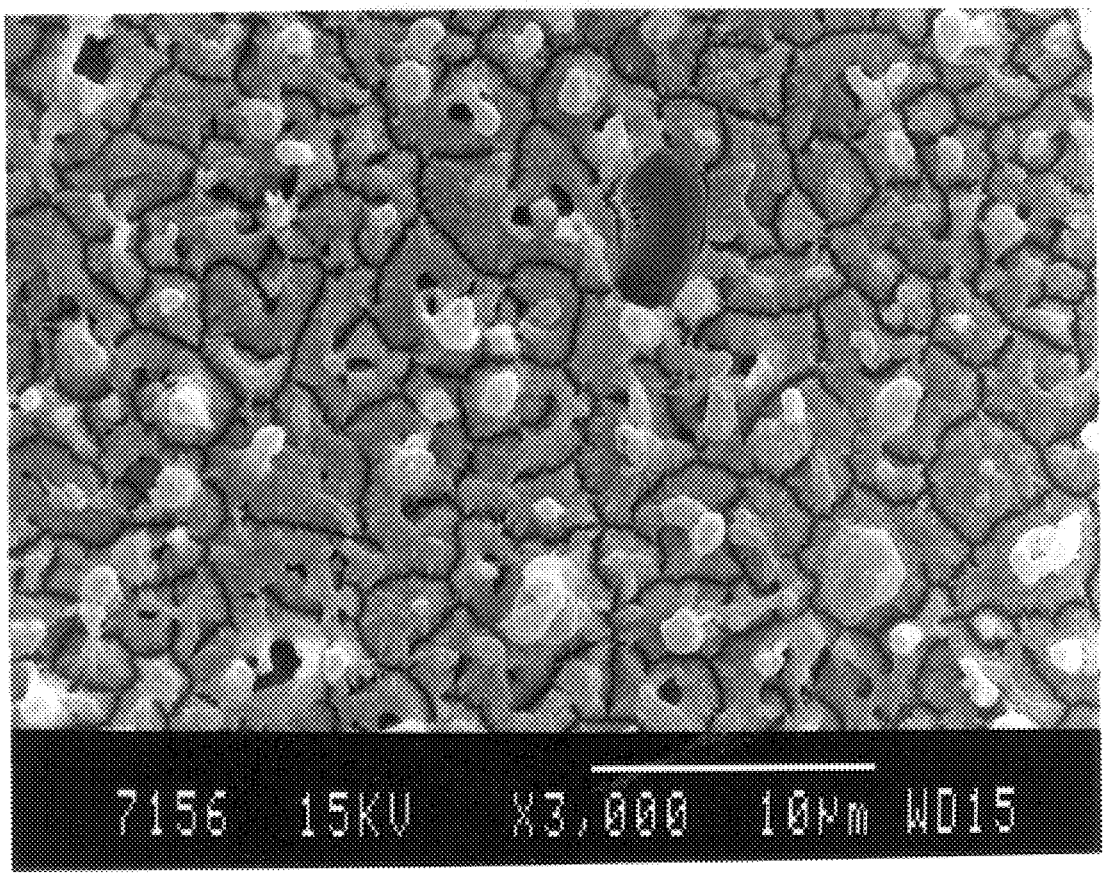
Figure 4A:
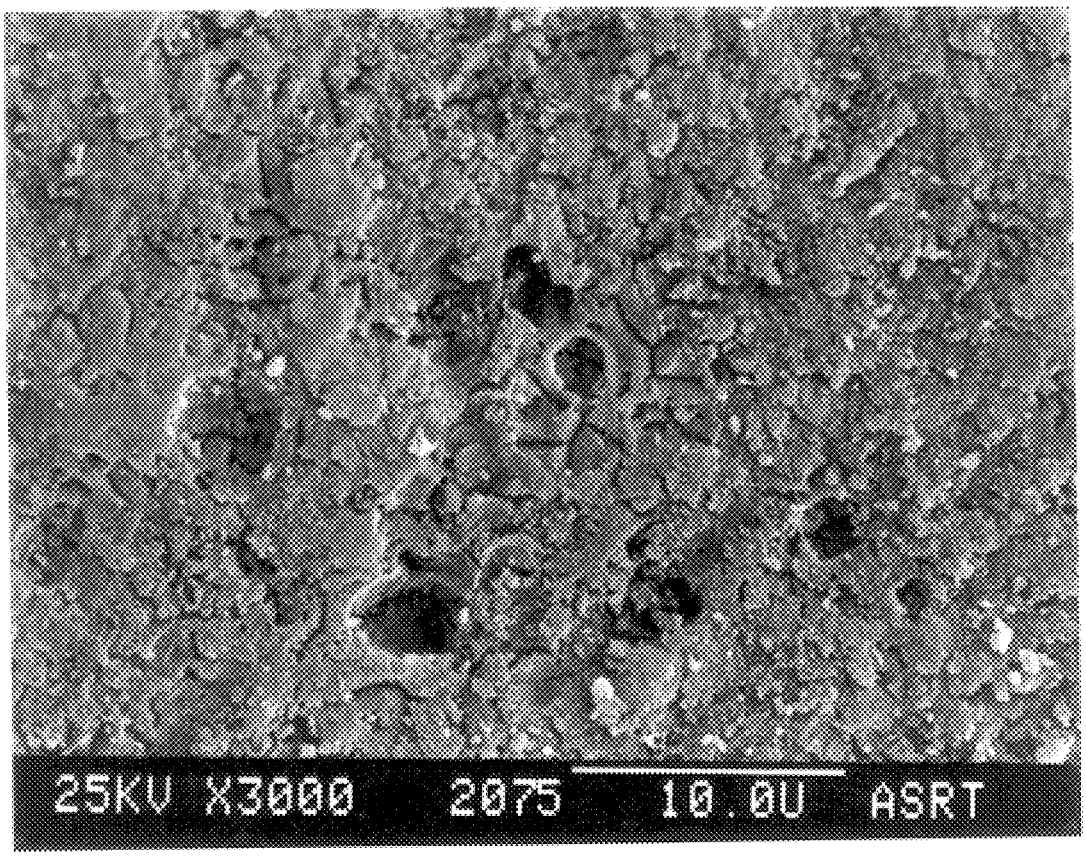
FIG. 4 is a series of photomicrographs illustrating aluminum surfaces anodized at 30°–37° C. and calcined at 150° C. (4a), 400° C. (4b), and 540° C. (4c).
Figure 4B:
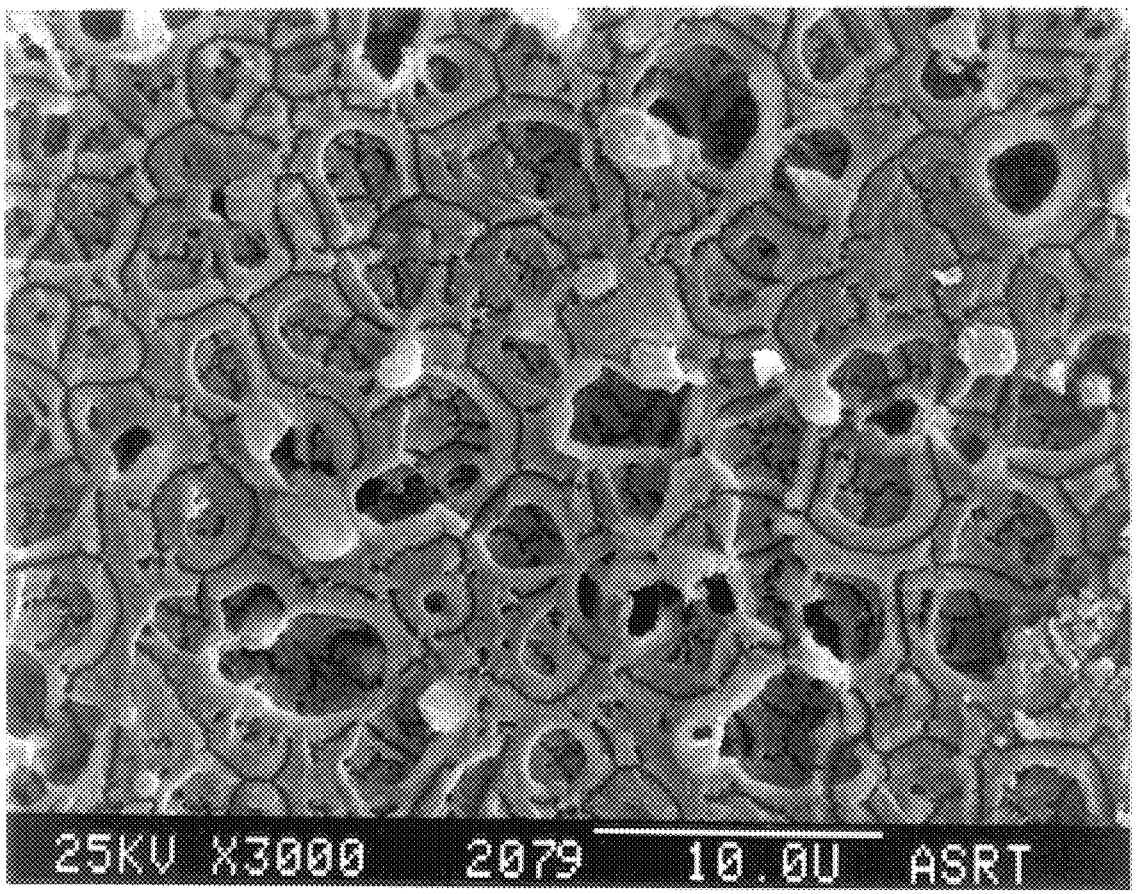
Figure 4C:
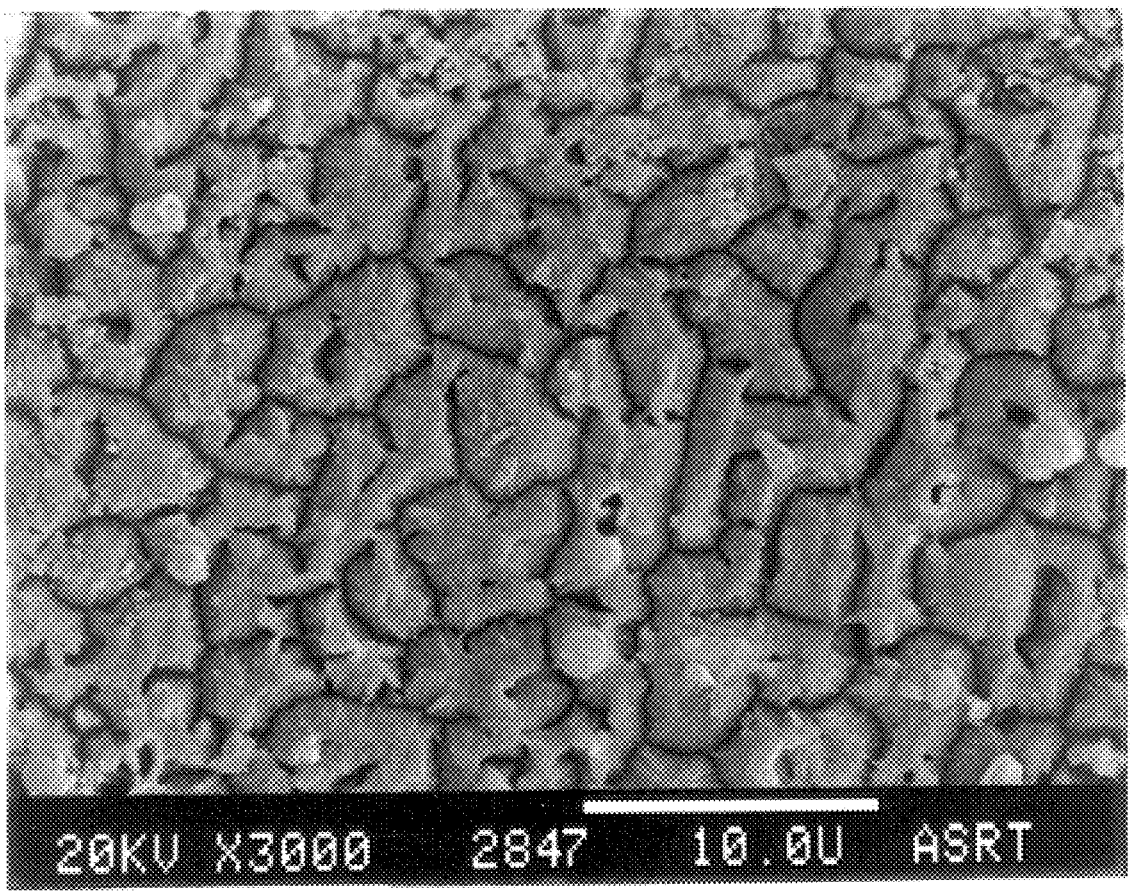

The effect of calcination temperature is illustrated in FIG. 4, where aluminum surfaces anodized at the preferred temperature range of 30°–37° C. are shown after calcination at various temperatures. FIG. 4a shows the aluminum surface after calcining at 150° C. FIG. 4b shows the surface after calcining at 400° C. FIG. 4c shows the surface after calcining at 540° C. These may be compared with FIG. 3d in which the surface was calcined at 440° C. It is evident that calcining at higher temperatures causes a significant change in the surface structure. Experience has shown that this change in structure is associated with improved catalytic performance, as is shown below. It is feasible, although not preferred, to omit the calcination step since similar temperatures are used after impregnation to decompose the compounds of the catalytic metals, as is illustrated in Example 7 below.

Catalyst Application

The methods used for applying the catalytic metals are familiar to those skilled in the catalyst art. In a preferred method, they may be applied as solutions of soluble compounds of the metals, either by dipping the anodized substrate into the solution or by otherwise applying an amount sufficient to deposit the desired metal loading. Following the impregnation step, the support is calcined at about 350° to 550° C. for a period of 1 to 6 hours to convert the metal compounds to the metals or their oxides.

Useful catalytic metals for ozone decomposition include various noble metals from Group VIII, particularly platinum and palladium, supplemented by base metals from Group VIII, preferably nickel, cobalt, and iron, or from Groups IIIb and VIIb preferably cerium and manganese. For oxidation of pollutants, the noble metals may be supplemented by base metals from Groups Ib, IIb, IIIa, IVa, Va, VIa, VIIa, and VIII. Various soluble noble metal compounds familiar to those skilled in the art may be used such as halogen compounds (e.g., chloroplatinic acid) and nitrogen compounds (e.g., palladium nitrate, ammonium chloroplatinate). For some applications chloride-free compounds provide superior results and compounds such as platinum sulfite acid (hydroxy disulfite platinum II acid) are preferred.

For an ozone converter palladium and nickel are preferably used in combination. For catalytic oxidation of pollutants, platinum is generally preferred, optionally in combination with base metals such as Ni, Co, Fe, Cu, Zn, Cr, W. Mn, and the rare earths.

The amount of the noble metals may vary up to about 150 g/ft$^3$ (5.3 g/L) of the monolith, preferably about 25 to 75 g/ft$^3$ (0.88 to 2.65 g/L). The base metals will often be applied in larger amounts up to about 500 g/ft$^3$ of the monolith (17.6 g/L), preferably about 200 to 400 g/ft$^3$ (7.06 to 14.1 g/L).

EXAMPLE 1

Anodization

A sample section of 104 $\mu$m thick aluminum finned substrate as described above measuring 1.61 in.×1.00 in.× 0.25 in. (40.9 mm×2.54 mm×30 6.35 mm) having a surface area of 24 in$^2$ (0.02 m$^2$) was immersed in a 9 wt. % H$_2$SO$_4$ solution. A cathode having a surface area of 95 in$^2$ (0.06 m$^2$) made of aluminum foil was also immersed in the H$_2$SO$_4$ solution. The substrate and the cathode were connected to a variable source of D.C. voltage (Heath Schlumberger) and a voltage of 15 volts was applied to begin the anodization of the substrate. The process was continued for about 1 hour during which time the voltage was gradually lowered to 8 volts to maintain a current density of about 9 mps/ft$^2$ (96.9 amps/m$^2$). Over the 1 hour period the temperature of the electrolyte rose from 30° C. to 40° C. due to the exothermic reaction.

Following the anodization step the anodized substrate was washed in water, dried at 150° C. for 15 minutes and measured. The weight loss was found to be 13.9 wt. %. The depth of the an anodized surface layer was 10 $\mu$m.

The sample was then calcined at 538° C. for 1 hour. After cooling the sample was dipped in deionized water, removed and the excess water blown off, and weighed. It was found that the water uptake was 7.9 wt. %.

EXAMPLE 2

Metals Application

The anodized and calcined sample of Example 1 was impregnated with a solution of Pd an d Ni compounds. 30.37 g of a 10.03 wt. % Pd (NO$_3$)$_2$ solution was added to 89.21 g of Ni(NO$_3$)$_2$·6H$_2$O and then diluted to 100 mL with deionized water. 5 wt. % sugar was added to complete the solution preparation. Then the calcined substrate was dipped into the solution and agitated for 30 seconds, after which the excess solution was blown off and the sample calcined at 538° C. for 1 hr. The impregnation was repeated twice. It was found that the impregnated sample had picked up 9.4% in weight. The amount of the metals deposited was found to be 418 g/ft$^3$ Ni (14.7 g/L) and 78 g/ft$^3$ Pd (2.75 g/L).

EXAMPLE 3

A micro reactor was assembled to test a short section of the offset-fin monolith prepared as in Examples 1 and 2 at one million space velocity (1×10$^6$ hr$^{-1}$). A section of a monolith 7 fins wide and 2 sets of 7 fins deep (see FIG. 1) measuring 0.5 in.×0.25 in.×0.2 in. (12.7 mm×6.35 mm×5.1 mm) was mounted in the reactor and air containing 2.4 ppm by volume of ozone was passed over the catalyst at 1×10$^6$ GHSV (@ STP). The ozone conversion was measured by a PCI ozone monitor (Model LC) before and after the reactor. The results are given in the following table.

TABLE A

| Temp, °C | Ozone Conv., % |
|---|---|
| 35 | 48 |
| 50 | 51 |
| 60 | 52 |
| 90 | 55 |
| 100 | 57 |
| 120 | 58 |
| 130 | 59 |
| 150 | 60 |
| 160 | 61 |
| 170 | 62 |
| 190 | 63 |
| 200 | 63.5 |

It can be seen that the conversion of ozone is not very sensitive to temperature and it is believed to be controlled by mass transfer of the ozone to the catalytic surface. Calculations indicate that if the catalyst contained 33 rows of fins rather than 2 rows, the conversion of ozone would be greater than 93%.

Testing for 72 hours indicated that the catalyst performance was retained with only about 2% reduction from the fresh conversion.

EXAMPLE 4

A sample of the aluminum finned substrate was anodized as described in Example 1 to provide an anodized surface layer of about 10 μm. The anodized sample was immersed in an aqueous solution of platinum sulfite acid to provide a platinum loading after calcination at 538° C. for about 1 hour of 50 g/ft³ Pt (1.76 g/L).

The resulting catalyst was tested for the oxidation of 300 ppm by volume of heptane in air at a space velocity of 1,000,000 hr$^{-1}$ as described in Example 3. Heptane oxidation began at about 160° C. and rose to about 12% at 200° C. and to about 28% at 250° C. As indicated in Example 3 higher conversions would be obtained with lower space velocity or a greater number of fin rows.

EXAMPLE 5

Another sample of aluminum finned substrate prepared as in Example 4 was tested for the oxidation of carbon monoxide in air. The concentration of CO was 900 ppm by volume and the space velocity again was 1,000,000 hr$^{-1}$. Oxidation began at about 125° C. and rose to about 15% at 175° C., 36% at 200° C. and 39% at 250° C.

EXAMPLE 6 (Comparative)

A sample of the aluminum finned substrate was anodized as described in Example 1 except that the initial temperature of the anodization bath was maintained at a constant 32° C. instead of beginning at 30° C. and rising to 40° C. After anodization, the sample was washed in water and then calcined at 440° C. for one hour. The sample was then impregnated with a solution of Pd and Ni compounds as described in Example 2. The amount of metals deposited was 25 g/ft³ Pd(0.88 g/L) and 100 g/ft³ Ni (3.53 g/L).

The completed catalyst was tested following the procedure described in Example 3 to determine its ability to convert ozone at temperatures of 65° C., 121° C., and 185° C.

A second sample of the aluminum finned substrate was anodized as in Example 1 except that the temperature of the anodization bath was maintained at a constant 20° C. instead of 30° C. The sample was then finished as described above except that the calcination was at 440° C. rather than 538° C. The amount of metals deposited was 25 g/ft³ Pd (0.88 g/L) and 100 g/ft³ Ni (3.53 g/L). The second catalyst was then tested as described in Example 3 for ozone conversion.

In the following table the results of the tests described above for the two samples are reported so that the effect of the anodization bath temperature can be seen.

TABLE B

| Inlet Temperature, | Theoretical | Actual Conversion, % at Anodization Temperature | |
| --- | --- | --- | --- |
| °C | Conversion, % | 32° C. | 20° C. |
| 65 | 57 | 54% | 41% |
| 121 | 60 | 57% | 54% |
| 185 | 65 | 65% | 65% |

The column labeled "Theoretical Conversion" provides a reference value for comparison with the actual conversion as measured experimentally. The calculation assumes that the catalyst is able to convert any ozone which reaches it, that is, the chemical reaction is not limiting. The calculation then is based on the reaction rate which should be observed if mass transfer of the reactants and products to and from the catalyst is limiting (L. Hegedus Pet. Div. ACS Preprints, August 1973, p. 487–502) This method is for straight channel monoliths and has been modified by us to account for the offset-fin design. If the actual conversion measured is the same as that of the mass transfer limited calculation predicts, then it follows that mass transfer is limiting in fact and that the catalyst activity is not. Conversely, if the conversion is lower than the mass transfer limited conversion, then the catalyst activity is limiting.

From a review of the data in Table B it can be concluded that the catalyst prepared with an aluminum surface anodized at 32° C. has an activity which is essentially mass transfer limited at the three temperatures measured. However, the catalyst prepared using aluminum which was anodized at 20° C. appears to be much less active since the conversion at 65° C. is much lower than would be predicted for a mass transfer limited catalyst. As the temperature is increased, the catalyst activity appears to increase so that at 185° C. mass transfer rather than catalyst activity is limiting.

The physical structure of the anodized surface is very different as has been shown in FIGS. 3 and 4. It is believed that the relatively rough and highly porous surface produced by the higher temperature anodization provides a higher surface area for deposition of the catalytic metals and a more active and durable catalyst results. This inference is supported by the results of the experiments reported above.

As demonstrated in Table B the fresh catalyst activity is affected by the condition of the alumina on the surface. We expect that the durability of the catalyst also would be affected. The catalyst prepared on a surface anodized at 20° C. would be expected to have a significantly shorter life than that prepared on a surface anodized at 32° C.

EXAMPLE 7

Two samples of the aluminum finned substrate were prepared as described in Example 2 except that one (7A) was not calcined before impregnation of the metal compounds which should produce a surface similar to that in FIG. 4a, while the second (7B) was calcined at 440° C. for one hour, which produces the rough and porous surface as in FIG. 3d. Both samples were heated for 440° C. for 1 hour after impregnation to decompose the metal compounds and leave catalytically active metals. After testing as in Example 6 at a temperature of 185° C., it was found that both samples maintained nearly their fresh activity after 120 hours exposure to 2 ppm ozone in air, both 7A and 7B having declined about 2–3% from the initial conversion of about 65%. It was concluded that the heating used to decompose the metal compounds was sufficient to produce a mass transfer limited catalyst and that pre-calcination before impregnation, having no detectable effect on the catalyst performance, at least in this short exposure, could be omitted. However, precalcination is preferred to assure development of the desired surface condition before the impregnation step.

What is claimed is:

1. A monolithic catalytic converter comprising
   (a) a unitary aluminum or aluminum alloy support within a housing providing tortuous flow paths for gases passing over said support and having an integral anodized surface layer at least 2 μm thick, said support comprising one or more plate fin elements having a plurality of fins arranged in an axial succession of offset fin rows, said anodized surface layer being formed by anodizing at a temperature of about 30°–37° C., followed by washing and optionally calcining said anodized surface layer at a temperature of 150° to 540° C.; and
   (b) one or more Group VIII noble metals and optionally base metals from Groups VIII, IIIa, and VIIa disposed on and within said anodized surface layer of (a).

2. The monolithic catalytic converter of claim 1 wherein said anodized surface layer is at least 10 μm thick.

3. The monolithic catalytic converter of claim 1 wherein said anodized surface layer has a surface area of 30 to 150 m$^2$/g.

4. The monolithic catalytic converter of claim 1 wherein said anodized surface layer is formed at an anodizing temperature of about 32° C. and calcined at a temperature of about 440° C.

5. A method of destroying ozone in air comprising passing ozone-containing air through a monolithic catalytic converter comprising
   (a) a unitary aluminum or aluminum alloy support within a housing providing tortuous flow paths for gases passing over said support and having an integral anodized surface layer at least 2 μm thick, said support comprising one or more plate fin elements having a plurality of fins arranged in an axial succession of offset fin rows, said anodized surface layer being formed by anodizing at a temperature of about 30°–37° C., followed by washing and optionally calcining at a temperature of 150° to 540° C.; and
   (b) one or more Group VIII noble metals and optionally base metals from Groups VIII, IIIa, and VIIa disposed on and within said anodized surface layer of (a).

6. The method of claim 5 wherein palladium is the Group VIII noble metal and nickel is the base metal.

7. The method of claim 6 wherein palladium is 0.88 to 2.65 g/L of said support.

8. The method of claim 6 wherein nickel is 7.06 to 14.1 g/L of said support.

9. The method of claim 5 wherein said anodizing temperature is about 32° C. and said calcining temperature is about 440° C.

10. A method of destroying atmospheric pollutants by oxidation comprising passing air containing pollutants through a monolithic catalytic converter comprising
    (a) a unitary aluminum or aluminum alloy support within a housing providing tortuous flow paths for gases passing over said support and having an integral anodized surface layer at least 2 μm thick, said support comprising one or more plate fin elements having a plurality of fins arranged in an axial succession of offset fin rows, said anodized surface layer being formed by anodizing at a temperature of about 30°–37° C., followed by washing and optionally calcining at a temperature of about 150° to 540° C.; and
    (b) one or more Group VIII noble metals and optionally base metals from Groups Ib, IIb, IIIa, IVa, Va, VIa, VIIa, and VIII disposed on and within said anodized surface layer of (a).

11. The method of claim 10 wherein said anodizing temperature is about 32° C. and said calcining temperature is about 440° C.

12. The method of claim 10 wherein platinum is the noble metal.

13. The method of claim 12 wherein said pollutants comprise a hydrocarbon.

14. The method of claim 12 wherein said pollutants comprise carbon monoxide.

15. A monolithic catalytic converter comprising
    (a) a unitary aluminum or aluminum alloy support within a housing providing tortuous flow paths for gases passing over said support and having an integral anodized surface layer at least 2 μm thick, said support comprising one or more plate fin elements having a plurality of fins arranged in an axial succession of offset fin rows, said anodized surface layer being formed by passing a direct current of about 9 amps/ft$^2$ and about 8 to 15 volts through said aluminum or aluminum alloy support as an anode in an electrolytic bath comprising 5–20 wt. % aqueous sulfuric acid at a constant temperature of about 30° to 37° C., and thereafter washing said anodize surface layer with water and optionally calcining at a temperature in the range of 150° to 540° C.; and
    (b) one or more Group VIII noble metals and optionally base metals from Groups VIII, IIIa, and VIIa disposed on and within said anodized and calcined surface layer of (a).

16. A catalytic converter of claim 15 wherein palladium is the Group VIII noble metal and nickel is the base metal.

17. A catalytic converter of claim 16 wherein palladium is 0.88 to 2.65 g/L of said support.

18. A catalytic converter of claim 16 wherein nickel is 7.06 to 14.1 g/L of said support.

19. A catalytic converter of claim 15 wherein said anodized surface layer is formed at an anodizing temperature of about 32° C. and calcined at a temperature of about 440° C.

20. A method of preparing an integral anodized catalytic surface layer on the surface of an aluminum or aluminum alloy consisting essentially of
    (a) anodizing said surface by passing a direct current of about 9 amps/ft$^2$ and about 8 to 15 volts through said aluminum or aluminum alloy surface in an electrolytic bath comprising 5–20 wt. % aqueous sulfuric acid at a constant temperature of 30° to 37° C.;
    (b) washing said anodized surface of (a) and optionally calcining said washed surface at a temperature in the range of 150° to 540° C.;
    (c) impregnating said washed and optionally calcined surface of (b) with solutions of compounds of one or more Group VIII noble metals and optionally with base metals from Groups Ib, IIb, IIIa, IVa, Va, VIa, VIIa, and VIII; and
    d) heating said impregnated surface of (c) to decompose said metal compounds.

* * * * *